Patented Dec. 23, 1947

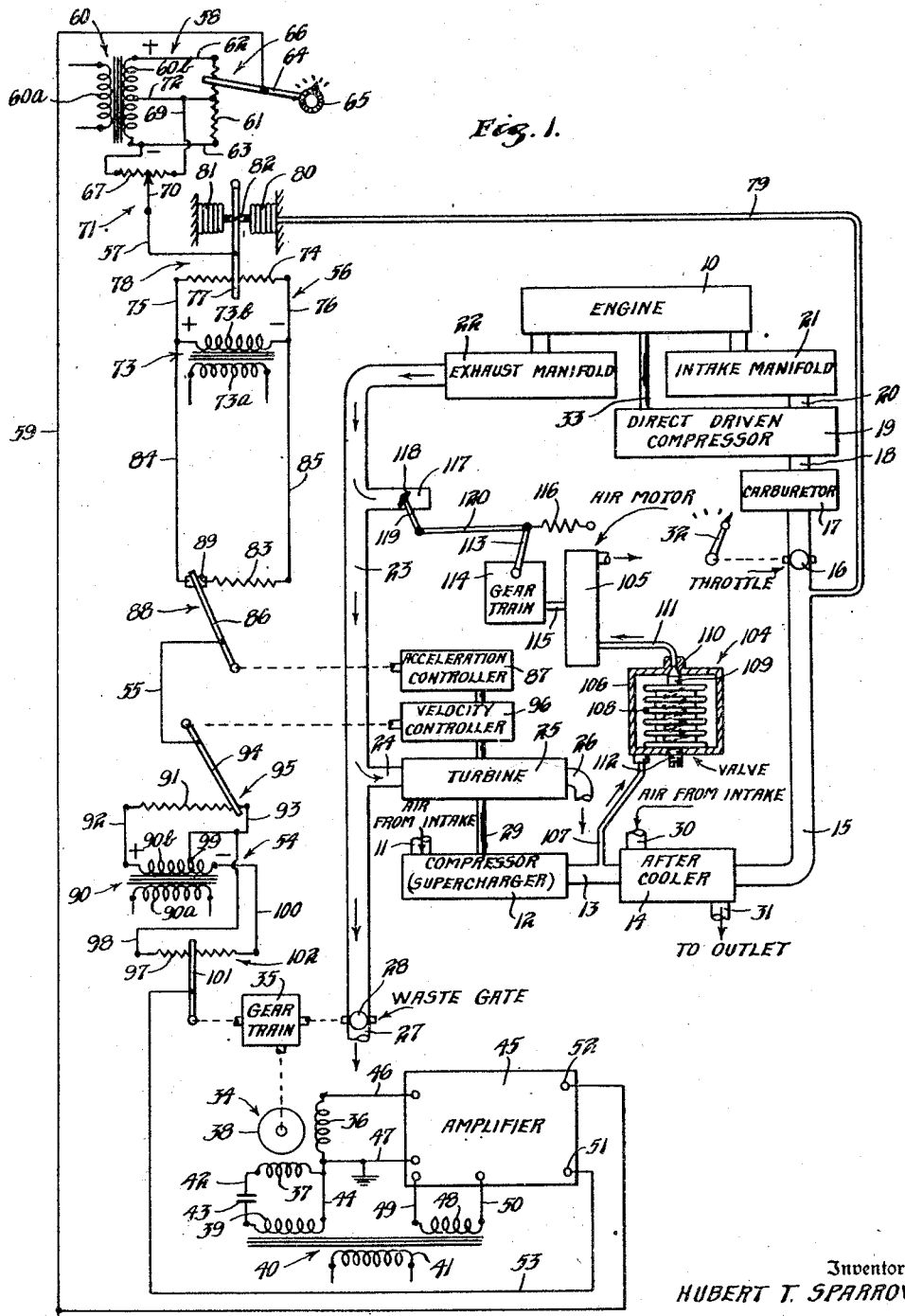

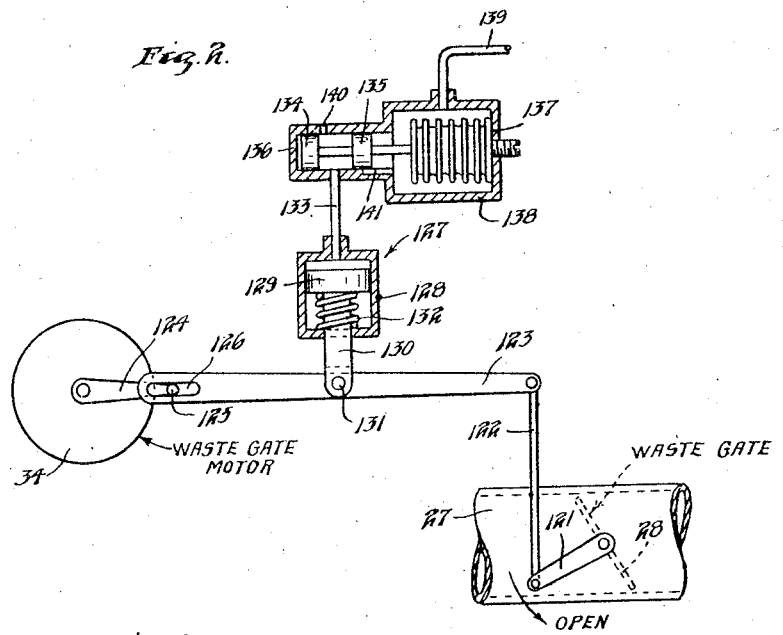
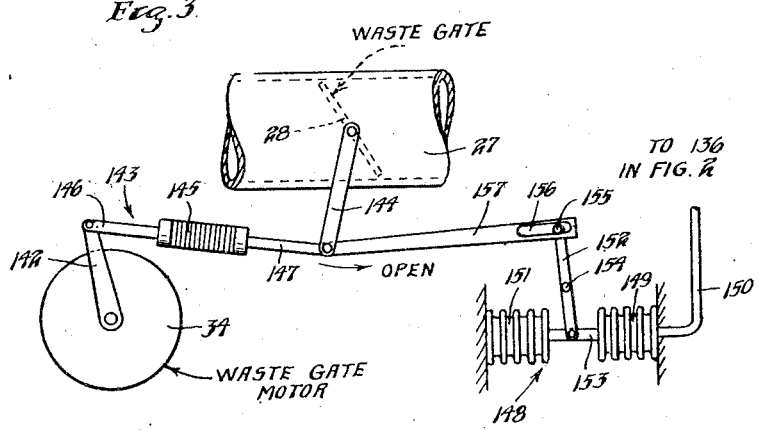

2,433,326

UNITED STATES PATENT OFFICE 2,433,326

PRESSURE CONTROL APPARATUS

Hubert T. Sparrow, Minneapolis, Minn., assignor to Minneapolis-Honeywell Regulator Company, Minneapolis, Minn., a corporation of Delaware Application May 19, 1944, Serial No. 536,331

12 Claims. (Cl. 230—5)

This invention relates to improvements in apparatus for controlling the discharge pressure of the turbine operated, supercharging compressors used for supplying air under compression to the intake manifolds of internal combustion engines.

It is the practice, particularly in the case of aircraft engines, to provide a turbo-supercharger unit for boosting the pressure of the air for combustion in order to increase the power of the engine and maintain a desired power output condition regardless of the variations in atmospheric pressure encountered at different altitudes. For this purpose a compressor, called the supercharger, is used and it is operated by a turbine powered by the exhaust gases from the engine. To control the speed of the turbine and compressor, and hence the pressure of the air discharged from the latter, the pressure and effect of the exhaust gases on the turbine is controlled by a damper or valve, known as the waste gate, which when opened allows the exhaust gases to escape freely to atmosphere and which, when progressively closed, diverts more and more of the gases to the turbine to increase the speed thereof. The position of the waste gate is thus seen to precisely govern the pressure of the air delivered to the engine.

For positioning the waste gate a reversible electric motor may be used, controlled by an electronic amplifier, which in turn responds to several controlling conditions to actuate the motor. Thus there may be a manual control by which intake manifold pressures may be selected and a pressure sensing or responsive control which will then operate to maintain the selected pressure within close limits, regardless of the changes in pressure of the air taken into the compressor as the aircraft flies at different altitudes. Such control systems are disclosed in detail in my co-pending sole application Serial No. 476,797, filed February 22, 1943 and in my co-pending joint application with Robert J. Kutzler Serial No. 486,992, filed May 14, 1943.

During operation at the higher altitudes especially, and whenever intake manifold pressure of the higher values are selected, the waste gate is necessarily near a closed position. Under such conditions the waste gate position is very critical due to the fact that the exhaust back pressure is then quite high and the turbine-compressor speed is near the highest safe values. Any failure or mismanagement of the operation of the system is then likely to cause the intake manifold pressure to exceed a safe value, causing damage to the engine; or it may cause over-speeding of the turbo-supercharger or the building up of excessive exhaust back pressure to reduce engine efficiency. Any of these malfunctions might very readily result in disaster to the aircraft and its occupants, particularly in military uses.

It is the custom in control systems of the type herein considered to provide means embodied in the electrical circuit for limiting the velocity and rate of acceleration of the turbo-supercharger unit to safe values, and also to limit the amount of compression which may be called for by the pilot or engineer. However, by their very nature such limiting means are subject to both electrical and mechanical failure, as well as a slight lag, characteristic of the circuits necessary, in their response to an overboost condition, as it is known to the art. It is possible therefore that even with such controls the pressures may reach a dangerous value.

It is the primary object of my present invention to provide means responsive to the discharge pressure of the supercharger for promptly and effectively reducing the operating speed of the turbine when such pressure exceeds, even momentarily, a predetermined maximum safe value, and to provide means of such nature which is purely mechanical and forms no part of the electrical control system, so that it will operate independently of any failure therein. Another object is to provide an overboost limit or control means for this purpose which operates to relieve the exhaust gas pressure upon the turbine and thus exert the most effective control on the speed thereof and over the pressure at the discharge side of the compressor. A further object is to provide a high limit discharge pressure control for the supercharger which will positively override the call of the electronic or electrical control system for pressure above the selected safe maximum value.

Other objects and advantages of my invention will become apparent from a consideration of the appended specification, claims and drawings. In the drawings:

Fig. 1 is a diagrammatical showing of a complete engine, induction and exhaust system, the electronic control for the intake manifold pressure, and one form of my means for preventing overboost in the compressor discharge pressure.

Fig. 2 is a somewhat diagrammatical showing of a modification of the overboost control.

Fig. 3 is a similar view of still another modification.

Referring now more particularly to Fig. 1, I show therein an engine 10, which may be the engine of an aircraft. Air for supporting combustion in the engine passes from an intake 11 through a compressor 12, a conduit 13, an aftercooler 14, a conduit 15, a throttle 16, a carburetor 17, a conduit 18, a direct driven compressor 19, a conduit 20, and an intake manifold 21 into the engine.

The exhaust gases from the engine issue from an exhaust manifold 22 and are discharged through a duct 23 having a branch 24 leading to a turbine 25. The turbine is provided with an outlet 26 through which the exhaust gases may escape to atmosphere after passing through the turbine. The conduit 23, commonly termed the exhaust stack, also has an outlet 27 to atmosphere, and controlling the flow of exhaust gases from this outlet is a damper or valve 28 known as the waste gate.

The compressor 12 is driven from the turbine 25 through a shaft 29 and the air compressed in this compressor 12 passes through the aftercooler 14, wherein the heat of compression is at least partly removed by passing fresh air from an intake 30 in heat exchanging relation with the compressor discharge air, after which the cooling air is delivered at the outlet 31.

The throttle 16 may be adjusted by the hand control 32, and in the carburetor 17 fuel from a supply (not here shown) is mixed with the air to form a combustible gas.

The compressor 19 is directly driven from the engine by shaft 33 and is utilized not only as a compressor but also to evenly distribute the mixture of fuel and air to all cylinders of the engine.

The waste gate 28 is driven by a motor 34 through a gear train 35. The motor 34 is of the split phase type, being provided with a pair of field windings 36 and 37 which are spaced ninety electrical degrees apart, and an armature 38. The field winding 37 is supplied with electrical energy from a secondary winding 39 of a transformer 40 having a primary winding 41 which is connected to a suitable source (not shown) of alternating current. The energizing circuit for the winding 37 may be traced from the left-hand terminal of the transformer winding 39 through a conductor 42, a condenser 43, the field winding 37, and a conductor 44 to the right-hand terminal of the secondary winding 39.

The flow of electrical energy to the motor field winding 36 is controlled by an electronic amplifier 45 to which the winding is connected by conductors 46 and 47. The amplifier 45 is powered from another secondary winding 48 on the transformer 40, to which the amplifier is connected through conductors 49 and 50.

The amplifier 45 is provided with a pair of input terminals 51 and 52 and operates to supply the field winding 36 of the motor with alternating current the phase of which depends upon the phase of an alternating current signal impressed across these input terminals 51 and 52. Any suitable form of amplifier may be used, but I prefer to employ one of the type shown in Fig. 1 of the co-pending application of Albert P. Upton, Serial No. 437,561, filed April 3, 1942, now matured into Patent No. 2,423,534 of July 8, 1947.

It will be evident that if the motor field winding 36 is supplied with alternating current which leads the current in the other field winding 37 by ninety electrical degrees the motor will rotate in one direction, whereas if the current in winding 36 lags the current in winding 37 by this amount, the motor will rotate in the opposite direction.

The phase of the signal applied to the amplifier input terminals 51 and 52 is determined by the electrical conditions existing in a compound network which consists of three separate networks connected in series. The circuit between the amplifier input terminals may be traced from terminal 51 through a conductor 53, a first electrical network 54, a conductor 55, a second electrical network 56, a conductor 57, a third electrical network 58, and a conductor 59, back to the input terminal 52.

The network 58 includes a transformer 60 having a primary winding 60a and a secondary winding 60b across the terminals of which is connected a slidewire resistance 61 by means of conductors 62 and 63. The conductor 59 is connected to a slider 64 which cooperates with the resistance 61 and which is adjustable thereacross by means of a control knob 65. The resistance 61 and slider 64 together form a control point adjuster 66 or manual selector for the intake manifold pressure control system.

Another slidewire resistance 67 is connected across one-half of the transformer secondary winding 60b by a conductor 68 connected to a lower terminal thereof and a conductor 69 connected to a center tap on the winding. A slider 70 cooperates with the resistance 67 to form a calibrating potentiometer designated generally at 71. The center tap of the winding 60 is connected by a conductor 72 to the center of the resistance 61 to decrease the impedance between the sliders 64 and 70.

The network 56 comprises a transformer 73 having a primary winding 73a and a secondary winding 73b across the terminals of which is connected a slidewire resistance 74 by means of conductors 75 and 76. Cooperating with this resistance 74 is a slider 77 which is connected to slider 70 by a conductor 57. The slider 77 and the resistance 74 together form a main pressure controller represented generally at 78, and this controller is adjusted in accordance with the pressure in the induction system of the engine. For this purpose a pressure take-off duct 79 is connected to any suitable point between the supercharging compressor 12 and the engine, and is here shown as connected to the duct 15 leading to the throttle 16. The duct 79 conveys the air pressure to the interior of a bellows 80. A second bellows 81 is evacuated and the two bellows 80 and 81 are supported with their free ends extending toward each other at opposite sides of the slider 77. These free ends are connected by link 82 to each other and to the slider 77 so that expansion and contraction of the bellows 80 in response to fluctuations in air pressure therein will shift the slider along the resistance 74. The evacuated bellows 81 compensates this controller for variations in atmospheric pressure in a well known manner.

A second slidewire resistance 83 is also connected across the winding 73b by means of conductors 84 and 85, and cooperating with resistance 83 is a slider 86 which is positioned in accordance with variations in the rate of acceleration of the turbine 25. For this purpose there is schematically shown a control device 87 connected to the operating shaft of the turbine, and the resistance 83 and slider 86 together form an acceleration compensating controller 88. It may here be noted that the slider 86 will normally remain in the position shown upon a dead spot 89 at the left-hand end of resistance 83, but will swing to the right upon the acceleration of the turbine beyond a safe value. The dead spot 89 is provided so that minor accelerations of the turbine will have no effect upon the system.

The network 54 includes a transformer 90 having a primary winding 90a and a secondary winding 90b. A slidewire resistance 91 is connected by conductor 92 to one terminal of secondary winding 90b and by a conductor 93 to an intermediate point or tap 99 on the winding. A slider 94 cooperates with the resistance 91 and is connected to the slider 86 by the aforesaid conductor 55. The slider 94 and resistance 91 cooperate to form a velocity responsive compensating controller 95, and the slider 94 is positioned by a velocity responsive control device 96 connected to and operated by the turbine 25. The slider 94 is moved over the resistance 91 by the control device 96 in accordance with the velocity of the turbine. It may be noted that the slider 94 will normally remain in the position shown upon a conductive bar 89 at the right-hand end of resistance 91, but will swing to the left upon the velocity of the turbine exceeding a predetermined value. The bar 89 is provided so that minor accelerations of the turbine will have no effect upon the system.

The network 54 also includes a slidewire resistance 97, the left-hand terminal of which is connected by a conductor 98 to the conductor 93 leading to the intermediate tap 99 on winding 90 and the right-hand terminal of which is connected by a conductor 100 to the right-hand terminal of winding 90. A slider 101 to which the aforesaid conductor 53 is connected cooperates with the resistance 97 to form a follow-up potentiometer 102. The slider 101 is moved along the resistance 97 by a connection to the gear train 35, and under control of the motor 34, the slider movement being thus concurrent with that of the waste gate 28.

The operation of the electrical control system being set out in detail in the hereinbefore identified co-pending application will be only sufficiently described herein to make clear the need and reason for my present improvements.

The primary windings of all of the transformers 60, 73 and 90 are connected to the same alternating current source as the primary 41 of transformer 40. To simplify the drawing, these connections have been omitted. In actual practice, only one transformer needs to be employed, secondary windings 60b, 73b, and 90b being formed as additional windings of transformer 40. In either case, the alternating potentials at the respective terminals of these transformer windings are at all times in phase with each other. The signal potential impressed across the amplifier input terminals 51 and 52 will thus be the algebraic sum of a number of potentials developed in the three networks 54, 56 and 58.

For convenience in description, the potential conditions existing during a half cycle at which the transformer windings have the polarities indicated by the legends will be considered. For a reference potential the conductor 59 is indicated as grounded, or of zero potential to ground, as shown at 103.

In the network 58, then, the slider 64 in the position shown is positive with respect to the center tap of the transformer while the slider 70, being at a mid-point along the resistance 67, is at a negative potential with respect to the center tap. This network is thus seen to introduce a potential into the series circuit connecting the amplifier input terminals of such polarity that the slider 70 and conductor 57 are negative with respect to grounded conductor 59.

Turning now to the network 56, it will be seen that with the sliders 77 and 86 in the position shown, this network introduces into the series circuit a potential equal to the potential of slider 77 with respect to the left terminal of transformer winding 73b. This potential is then such that slider 86 and conductor 55 are positive with respect to slider 77. The potential of conductor 55 with respect to ground depends upon the relative magnitudes of the respectively negative and positive potentials produced by the networks 58 and 56. For convenience this potential may be considered to be such that conductor 55 is positive with respect to grounded conductor 59.

Considering finally the network 54, it will be evident that since slider 94 is at the right-hand extremity of the resistance 91, the conductor 93 leading to the tap in the transformer winding 90 is at the same (positive) potential with respect to ground as is the conductor 55, leading to this network. The resistance 97 being connected between this point, or conductor 93, and the now negative terminal of the winding 90, the conductor 53 thus is negative with respect to conductor 93 by an amount dependent upon the value of the resistance between slider 101 and conductor 98. Thus network 54 introduces a negative potential into the series circuit and under a condition of balance the magnitude of this negative potential is equal to and opposes the positive potential produced by the algebraic sum of the effects of networks 56 and 58.

Under such conditions the amplifier input terminal 51 is at the same ground potential as is terminal 52, no signal is then impressed in the amplifier, and the amplifier supplies no current to the motor field winding 36. The waste gate 28 then remains stationary. However, should any of the sliders be shifted from their positions at which the compound network is balanced a signal potential will develop across the amplifier input terminals resulting in the supply of an operating current to the motor field winding 36 such as to cause the motor 34 to rotate and change the position of the waste gate.

For example, consider the result of a rise in pressure in the engine induction system. The bellows 80 is then expanded and the slider 77 is moved to the left along the resistance 74, reducing the magnitude of the positive potential introduced by the network 56 into the series circuit. This positive potential is thus made insufficient to completely cancel or oppose the sum of the negative potentials introduced by the networks 58 and 54 and a signal potential appears at the amplifier input terminal 51 such that this terminal is negative with respect to terminal 52. It is assumed that the amplifier and motor are properly connected to respond to a signal of this polarity or phase so that the amplifier supplies motor field winding 36 with an alternating current potential of the proper phase relation to cause the motor to rotate in proper direction to move the waste gate 28 toward open position. At the same time the slider 101 is moved toward the left along the resistance 97.

The opening movement of the waste gate 28 reduces the pressure of the exhaust gases exerted on the turbine 25, causes the speed thereof to decrease and reduces the compressing effect of the compressor 12. The pressure of the air supplied to the engine 10 and to bellows 80, is now reduced and the slider 77 begins to work back to the right along resistance 74. The movement of the slider 101 to the left along resistance 97, coincident with the opening movement of the waste gate 28, introduces a balancing positive potential into the series network and this movement will continue until this balancing potential is exactly equalled by the potential introduced by operation of the controller 78 and the series network is again balanced. The motor 34 then stops, leaving the waste gate in the newly selected position.

In similar manner, a decrease in discharge pressure of the supercharger 12 will introduce an opposite potential by action of the controller 78, causing a signal of opposite phase to be applied to the amplifier which then runs the motor in the opposite direction to close the waste gate and boost the pressure. Such operation is accompanied by a rebalancing movement of the slider 101 to bring the network to balance again.

The same actions occur upon the movement of either of the manually adjusted sliders 64 and 70, and it will be evident without further description herein that, when properly functioning and energized, the system will permit the selection of any desired discharge pressure for the supercharger under control of controller 66 and will maintain such pressure by means of controller 78.

The function of the controllers 88 and 95 will likewise be apparent, the former serving to introduce a potential into the network such as to open the waste gate 28 when the turbine accelerates at too rapid a rate, while the latter causes the same effect if the turbine exceeds a maximum safe velocity. Such limiting control on the speed and rate of acceleration of the turbo-supercharger unit is effective so long as the electrical circuit is intact and properly energized, and while conditions throughout are within range of control.

However, the failure of the system for any reason may cause the induction system pressure to rise above a safe maximum and may cause the exhaust back pressure to exceed a permissible value for proper engine operation; or the call of the system for the higher values of induction system pressure may result in the creation of pressures such as to cause damage to the engine even if only maintained for a short period while the system accommodates itself to changing conditions.

What is needed, it will be apparent, is a means responsive to the even momentary rise of the induction system pressure above a selected maximum safe value, or to a condition of overboost as it is termed, to instantaneously relieve the pressure, independently of the operation of the electrical control system. By use of such means, then, the engine, turbine and supercharger are all positively protected against any such damaging conditions arising.

Still referring to Figure 1 of the drawing, I show in connection with the induction and exhaust system of the engine one practicable means for accomplishing my purpose. The basic units thereof are a pressure responsive valve 104 and an air motor 105. While the latter may be a turbine, bellows or cylinder drive of any suitable kind adjusted to provide a mechanical movement in response to admission of air under pressure, an air turbine is particularly suitable for this purpose.

For purposes of exemplification, the valve 104 is shown as comprising an enclosed, box-like casing 106 the interior of which communicates with some point along the route between the discharge side of the compressor 12 and the engine, preferably at a point close to the discharge outlet of the compressor, through a conduit 107. Thus there is present within said casing 106 air under the same pressure substantially as that supplied by the compressor. Within the casing I provide an evacuated bellows 108, one end of which is supported on the casing side wall and the other end of which carries or reciprocates a valve member 109. In response to contraction of the bellows 108 this valve member is pulled from its seat in a bleed port 110 in the casing 106, permitting the escape of air from the interior of the casing, and from the conduit 13, into a conduit 111 leading to the air motor 105.

Normally, the bellows 108 is expanded to hold the valve 109 to its seat and close the bleed port 110 to prevent the escape of the air. For this purpose the bellows 108 may be spring loaded in a well known manner and the force exerted by the spring may be controlled by an adjustment screw 112 so that the bellows will remain expanded except when the pressure of the surrounding, induction system air is sufficient to overcome the spring. Thus it will be seen that the bellows 108 may be adjusted to open the bleed port 110 instantly when the pressure of the air in the induction system of the engine reaches a selected maximum value so that air can flow under pressure to the air motor 105.

Such admission of the air under pressure to the air motor 105 sets same in operation and as here shown causes movement of a crank 113 toward the left from the indicated position. The crank 113 is shown as actuated by a gear box 114 from the output shaft 115 of the motor, and the crank is biased by a spring 116 to normally stand in the position shown. An outlet 117 is provided in the exhaust stack or conduit 23, as here illustrated ahead of the turbine 25, and in this outlet is located a relief damper or valve, or second waste gate 118. An arm 119 is provided for swinging the valve 118 and said arm is connected by a link 120 to the aforesaid crank 113.

Under normal conditions the valve 104 is closed, the air motor 105 is inoperative and the valve 118 is closed, and such conditions maintain as long as the discharge pressure of the compressor 12 does not exceed a safe value. The relief valve 118 while closed obviously will have no effect on the operation of the turbine 25, or the control of the waste gate 28 thereover.

Now should the compressor discharge pressure exceed the predetermined maximum safe value, the bellows 108 will be collapsed by the pressure then brought to bear on it, the valve member 109 will open the bleed port 110 and the air will flow to the air motor 105 setting it in operation to swing the crank 113. The link 120 then swings the arm 119 to open the relief valve 118, permitting the exhaust gases to escape to atmosphere through the outlet 117. The pressure of the exhaust gases upon the turbine 25 is thus immediately relieved, causing the turbine speed to fall off and the compressor 12 to slow down and reduce its discharge pressure. As soon as the pressure falls below the safe value again the bellows 108 will expand shutting off the flow of air to the motor 105 and the relief valve 118 will again close. Thus it is evident that I provide simple and fast acting mechanical means for overriding the control system and relieving excess or overboost pressures, and for ensuring that such pressures cannot be developed even if the control system fails entirely.

Referring now to Figure 2 of the drawing, I have shown therein a modified way of accomplishing the end result of the means of Figure 1. In this case, the waste gate 28 in the exhaust stack outlet 27 is shown as operated by an arm 121 which is connected by a rod 122 to one end of a floating or swinging link 123. The other end of the link 123 is arranged to be oscillated by a crank 124 on the waste gate motor 34, said crank having a finger 125 at its end playing in a slot 126 in the link for this purpose.

An air motor designated generally at 127 supports and adjusts the link 123 and as herein shown such motor includes a cylinder 128 wherein is arranged a piston 129 having a piston rod 130 projecting from one end of the cylinder and pivotally connected at 131 to the link intermediate its ends. Normally, the piston 129 is urged toward the other end of the cylinder by an expansion coil spring 132 and to this end of the cylinder is connected a duct 133.

The duct 133 may be connected in any suitable manner to receive air at induction system pressure from the engine when this pressure exceeds the safe value. I have here chosen the duct as communicating with the space between two valve pistons 134 and 135 arranged in a valve cylinder 136 and connected for reciprocation to a bellows 137 supported by one end in a casing 138. Air from the induction system is admitted to the casing 138 by a duct 139 and the bellows functions as described in connection with Figure 1. Thus as the pressure rises above the selected maximum, the bellows 137 is contracted, moving the valve pistons 134 and 135 to the right in Figure 2. This action causes piston 134 to seal off an escape port 140 in the wall of the valve cylinder 136, which normally bleeds off the high pressure air from the duct 133 and motor cylinder 138, and causes piston 135 to open a port 141 to admit high pressure air from the casing 138 into the duct 133. When the pressure in the casing 138 falls the expansion of the bellows 137 will return the parts to their normal positions here shown.

In operation, the piston 129 normally stands in the position illustrated and the air motor thus serves as a fulcrum mounting for the link 123. Thus opposite swinging movements of the crank 124, in response to reversal of the waste gate motor 34 as previously described, will oppositely swing the link about the pivot connection 131 and oppositely adjust the arm 121 through rod 122 to position the waste gate 28. In the arrangement shown downward movement of the right-hand end of the link 123 opens the waste gate. Now should the pressure in the induction system of the engine rise to a point sufficient to operate the valve pistons 134 and 135 as has been described, induction system air will flow into the duct 133 and acting against the piston 129 will urge same downward against the tension of the spring 132. The resulting downward projection of the piston rod 130 will then swing or float the link 123 downward at its right-hand end, the link in such operation pivoting about its connection with the motor crank 124. The waste gate 28 will thus be opened to reduce the turbine speed and relieve the overboost in pressure in the induction system. As soon as this occurs the piston 129 will move back toward starting position to restore the waste gate to normal control by the motor 34. It will be noted that the floating movement of the link, responsive to an overboost condition may override the control of the motor over the waste gate in any position of the latter.

In Figure 3, I illustrate still another modification of my invention, wherein the waste gate 28 in the exhaust outlet 27 is positioned by a crank 142 on the waste gate motor 34, said crank being connected by a link 143 to an arm 144 for swinging the gate. Embodied in the link 143 is a strain release or spring 145 which connects separate, axially movable sections 146 and 147 of the link. These are so arranged that it is possible, by a pull upon the arm 144 such as to extend the strain release spring 145, to swing the waste gate 28 toward open position regardless of action of the motor 34.

An air motor 148 is again provided and in this case comprises a bellows 149 the interior of which is connected by a duct 150 to the valve cylinder 136 of Figure 2 to receive air at induction system pressure therefrom. A spring loaded evacuated compensating bellows 151 is also provided and the two bellows are supported with their free ends at opposite sides of a lever 152 to a lower end of which these ends are pivotally connected by a link 153. The lever 152 is fulcrumed at 154 and at an opposite end has a finger 155 which plays in a slot 156 in the end of a draw link 157. The opposite ends of the draw link 157 is pivotally connected to the waste gate arm 144.

In operation, as the waste gate 28 approaches its closed position the finger 155 nears the right-hand end of the slot 156. Now if the induction system pressure rises above the relief point of the valve of Figure 2, this valve will open and air will flow from the induction system into the bellows 149. The resulting expansion of the bellows 149 will swing the lever 152 toward the right at its upper end to exert a pull upon the draw link 157 such as to swing the waste gate 28 toward open position against the tension of the strain release 145. As soon as the induction system pressure falls below its maximum safe value, the parts will return toward normal positions and the motor will resume full control over the waste gate.

It will be evident that the various types of air motors and valves herein shown may be interchanged in the various systems, and the specific illustrations are therefore to be considered as examples only.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for controlling the pressure of the air supplied for combustion in an engine having a turbine driven compressor powered by exhaust gases from the engine, comprising in combination, a valve for varying the pressure differential of the exhaust gases across the turbine, control means for positioning said valve in such a manner as to maintain the discharge pressure of the compressor at a selected value within a predetermined range, and means operated by air taken from the compressor when the pressure thereof exceeds a safe maximum value for reducing the pressure differential of the exhaust gases across the turbine regardless of the position of the said valve.

2. Apparatus for controlling the pressure of the air supplied for combustion in an engine having a turbine driven compressor powered by exhaust gases from the engine, comprising in combination, a valve for varying the pressure differential of the exhaust gases across the turbine, control means for positioning said valve in such a manner as to maintain a controlling condition at a selected value, a second valve operative when opened to reduce the pressure differential of the exhaust gases across the turbine regardless of the position of the first valve member, and means including a device responsive to the pressure of the air discharged by said compressor for opening said second valve member when the pressure of said discharge air exceeds a selected magnitude.

3. Apparatus for controlling the pressure of the air supplied for combustion in an engine having a turbine driven compressor powered by exhaust gases from the engine, comprising in combination, a valve for varying the pressure differential of the exhaust gases across the turbine, control means for positioning said valve so that the pressure of the air discharged from said turbine is maintained at a first predetermined value, a second valve operative when opened to reduce the pressure differential of the exhaust gases across the turbine regardless of the position of the first mentioned valve, and means operated by air taken from the compressor when the discharge pressure thereof exceeds a second predetermined value higher than said first predetermined value for opening said second valve.

4. Apparatus for controlling the pressure of the air supplied for combustion in an engine having a compressor for compressing said air, comprising in combination, means for controlling the speed of the compressor, electrical motor means for operating said speed controlling means, an electrical system for operating and controlling said motor means in such a manner as to maintain the air supplied to the engine at a selected pressure within a predetermined range, means connecting the motor means and the speed controlling means and including a floating link swingable about a fulcrum point by operation of said motor means, and means operative by the air delivered by the compressor in response to the pressure of said air rising to a predetermined value above said range for positioning said fulcrum point of the link member in such a direction as to move said speed controlling means to reduce the speed of the compressor.

5. Apparatus for controlling the pressure of the air supplied for combustion in an engine having a turbine driven compressor powered by exhaust gases from the engine, comprising in combination movable means for controlling the speed of the turbine and compressor, motor means for operating said speed controlling means, an electrical system for operating and controlling said motor means so as to maintain the pressure of the air supplied by said turbine at a first predetermined value, means connecting the motor means and the speed controlling means and including a link member having a strain release normally having no effect on the movement of said speed controlling means by said motor means but yieldably restraining movement of said speed controlling means independently of said motor means in a direction such as to reduce the speed of the turbine and compressor, and means for overcoming said strain release in response to an increase in pressure of the air delivered by the compressor above a second predetermined value higher than said first predetermined value and for positioning said speed controlling means in a direction for reducing turbine and compressor speeds.

6. Apparatus for controlling the pressure of the air supplied for combustion in an engine having a compressor for compressing said air, comprising in combination, means for controlling the speed of the compressor, electrically controlled motor means for operating said speed controlling means, a current controlling device responsive to a pressure condition of said air, electrical means including said current controlling device for controlling said motor means to cause the same to control the compressing effect of said compressor in such a manner as to maintain said pressure condition at a selected value within a predetermined range, and air operated motor operatively connected to said speed controlling means and capable of overcoming the effect of said previously named motor means, and means for supplying a portion of the air delivered by said compressor to said air operated motor whenever the pressure of said air exceeds a predetermined value higher than said range.

7. Apparatus for controlling the pressure of the air supplied for combustion in a combustion chamber of an engine having a turbine driven compressor powered by exhaust gases from the engine, comprising in combination, a valve for varying the pressure differential of the exhaust gases across the turbine, a motor for positioning said valve, a device responsive to a pressure condition of said air, means including said controlling device for controlling said motor to cause the same to position said valve in such a manner as to maintain the discharge pressure of the compressor at a selected value within a predetermined range, means including an air operated device for operating said valve without the aid of said motor in a direction to decrease the pressure differential of said exhaust gases across said turbine, and means for supplying a portion of the air delivered by said compressor to said air operated device whenever the pressure of said air assumes a value which normally indicates that said pressure condition has a value higher than said range.

8. Apparatus for controlling the pressure of the air supplied for combustion in a combustion chamber of an engine having a turbine driven compressor powered by exhaust gases from the engine, comprising in combination, a valve for varying the pressure differential of the exhaust gases across the turbine, an electrically controlled motor for positioning said valve, a current controlling device responsive to a pressure condition of said air, electrical means including said current controlling device for controlling said motor to cause the same to position said valve in such a manner as to maintain the discharge pressure of the compressor at a selected value within a predetermined range, means including an air operated device for operating said valve without the aid of said motor in a direction to decrease the pressure differential of said exhaust gases across said turbine, and means for supplying a portion of the air delivered by said compressor to said air operated device whenever the pressure of said air assumes a value which normally indicates that said pressure condition has a value higher than said range.

9. Apparatus for controlling the pressure of the air supplied for combustion in a combustion chamber of an engine having a compressor for compressing said air, comprising in combination, means for controlling the speed of the compressor, motor means for operating said speed controlling means, a controlling device responsive to a pressure condition of said air, means including said controlling device for controlling said motor means to cause the same to control the compressing effect of said compressor in such a manner as to maintain said pressure condition at a selected value within a predetermined range of absolute pressures, means including an air operated motor and connections between said motor and said speed controlling means for operating said speed controlling means in speed reducing direction if said previously named motor means is not properly operative, and means for supplying a portion of the air delivered by said compressor to said air operated motor whenever the pressure of said air assumes a value which normally indicates that said pressure condition has a value higher than said range.

10. Apparatus for controlling the pressure of the air supplied for combustion in a combustion chamber of an engine having a compressor for compressing said air, comprising in combination, means for controlling the speed of the compressor, electrically controlled motor means for operating said speed controlling means, a current controlling device responsive to a pressure condition of said air, electrical means including said current controlling device for controlling said motor means to cause the same to control the compressing effect of said compressor in such a manner as to maintain said pressure condition at a selected value within a predetermined range of absolute pressures, means including an air operated motor and connections between said motor and said speed controlling means for operating said speed controlling means in speed reducing direction if said previously named motor means is not properly operative, and means for supplying a portion of the air delivered by said compressor to said air operated motor whenever the pressure of said air assumes a value which normally indicates that said pressure condition has a value higher than said range.

11. Apparatus for controlling the pressure of the air supplied for combusion in a combustion chamber of an engine having a compressor for compressing said air, comprising in combination, means for controlling the speed of the compressor, an electrically controlled motor means for operating said speed controlling means, a current controlling device responsive to a pressure condition of said air, electrical means including said current controlling device for controlling said motor means to cause the same to control the compressing effect of said compressor in such a manner as to maintain said pressure condition at a selected value within a predetermined range of absolute pressures, means including an air operated device for reducing the speed of said compressor independently of said electrical means if said previously named motor means is not properly operative, and means for supplying a portion of the air delivered by said compressor to said air operated motor whenever the pressure of said air assumes a value which normally indicates that said pressure condition has a value higher than said range.

12. Apparatus for controlling the pressure of the air supplied for combustion in a combustion chamber of an engine having a compressor for compressing said air, comprising in combination, means for controlling the speed of the compressor, an electrical rotary motor for operating said speed controlling means, a current controlling device responsive to a pressure condition of said air, electrical means including said current controlling device for controlling the energization of said motor to cause the same to control the compressing effect of said compressor in such a manner as to maintain said pressure condition at a selected value within a predetermined range of absolute pressures, means including an air operated turbine for reducing the speed of said compressor if said previously named motor means is not properly operative, and means for supplying a portion of the air delivered by said compressor to said air operated turbine whenever the pressure of said air assumes a value which normally indicates that said presure condition has a value higher than said range.

HUBERT T. SPARROW.

REFERENCES CITED

The following references are of record in the file of this patent:

UNITED STATES PATENTS

| Number | Name | Date |
|---|---|---|
| 1,508,707 | Moss | Sept. 16, 1924 |
| 1,508,731 | Standerwick | Sept. 16, 1924 |
| 1,557,793 | Berger et al. | Oct. 20, 1925 |
| 1,586,233 | Anschutz-Kaempfe | May 25, 1926 |
| 2,106,237 | Bush | Jan. 25, 1938 |
| 2,376,142 | Hoffman et al. | May 15, 1945 |
| 2,376,143 | Edwards et al. | May 15, 1945 |

FOREIGN PATENTS

| Number | Country | Date |
|---|---|---|
| 292,552 | Great Britain | Jan. 3, 1929 |